(12) United States Patent
An et al.

(10) Patent No.: US 10,560,986 B2
(45) Date of Patent: Feb. 11, 2020

(54) METHOD FOR DETECTING THE STATUS OF POPCORN IN A MICROWAVE

(71) Applicant: WHIRLPOOL CORPORATION, Benton Harbor, MI (US)

(72) Inventors: Rodger An, Guangdong (CN); Anders B. Zeijlon, Norrkoeping (SE); James C. Johncock, Shelbyville, MI (US); Lai Kwok Wah, Guangdong (CN); Jack Xu, Guangdong (CN); Winner Wang, Norrkoeping (SE)

(73) Assignee: Whirlpool Corporation, Benton Harbor, MI (US)

( * ) Notice: Subject to any disclaimer, the term of this patent is extended or adjusted under 35 U.S.C. 154(b) by 735 days.

(21) Appl. No.: 14/912,475

(22) PCT Filed: Aug. 20, 2013

(86) PCT No.: PCT/CN2013/081837
§ 371 (c)(1),
(2) Date: Feb. 17, 2016

(87) PCT Pub. No.: WO2015/024177
PCT Pub. Date: Feb. 26, 2015

(65) Prior Publication Data
US 2016/0205973 A1    Jul. 21, 2016

(51) Int. Cl.
*H05B 6/80* (2006.01)
*H05B 6/64* (2006.01)

(52) U.S. Cl.
CPC ............ *H05B 6/80* (2013.01); *H05B 6/6458* (2013.01); *A23V 2002/00* (2013.01)

(58) Field of Classification Search
CPC ........ H05B 6/80; H05B 6/6447; H05B 6/645; H05B 6/6452; H05B 6/6458; A23L 5/34; A23L 7/183
See application file for complete search history.

(56) References Cited

U.S. PATENT DOCUMENTS

| 2,742,612 A | 4/1956 | Cohn |
| 2,981,904 A | 4/1961 | Ajioka et al. |
| (Continued) | | |

FOREIGN PATENT DOCUMENTS

| CN | 1523293 A | 8/2004 |
| CN | 101118425 | 2/2008 |
| (Continued) | | |

OTHER PUBLICATIONS

International Searching Aurhtority, International Search Report and Written Opinion for International Application No. PCT/CN2013/081837, 5 pages, dated Aug. 20, 2013.

*Primary Examiner* — Erik Kashnikow
*Assistant Examiner* — Lela S. Williams
(74) *Attorney, Agent, or Firm* — Price Heneveld LLP

(57) ABSTRACT

A method of popping popcorn in a microwave having a cooking chamber, an energy source which provides energy to the cooking chamber, a humidity sensor, and a microphone sensor, includes the steps of placing a plurality of popcorn kernels in the cooking chamber. The energy source is operated during a popcorn popping cycle. Popping sounds generated when the popcorn kernels are popped are detected, as is the humidity level in the cooking chamber. The energy source is directed to stop operating when the popping sound and the humidity level satisfy one or more end status indicators. The current disclosure also includes a microwave for carrying out the above described process.

20 Claims, 9 Drawing Sheets

(56) References Cited

U.S. PATENT DOCUMENTS

| | | |
|---|---|---|
| 3,265,995 A | 8/1966 | Hamasaki |
| 3,430,023 A | 2/1969 | Tingley |
| 3,737,812 A | 6/1973 | Gaudio et al. |
| 4,088,861 A | 5/1978 | Zwillinger |
| 4,139,828 A | 2/1979 | Commault et al. |
| 4,143,646 A | 3/1979 | Sampsel et al. |
| 4,196,332 A | 1/1980 | MacKay et al. |
| 4,354,562 A | 10/1982 | Newman |
| 4,374,319 A | 2/1983 | Guibert |
| 4,463,324 A | 7/1984 | Rolfs |
| 4,628,351 A | 12/1986 | Heo |
| 4,703,151 A | 10/1987 | Sakamoto |
| 4,743,728 A | 5/1988 | Nagafusa et al. |
| 4,786,774 A | 11/1988 | Kaminaka |
| 4,870,238 A | 9/1989 | Hodgetts et al. |
| 4,886,046 A | 12/1989 | Welch et al. |
| 4,937,413 A | 6/1990 | Spruytenburg et al. |
| 5,075,525 A | 12/1991 | Jung |
| 5,369,254 A | 11/1994 | Kwon |
| 5,483,045 A | 1/1996 | Gerling |
| 5,619,983 A | 4/1997 | Smith |
| 5,736,717 A * | 4/1998 | Lee .................. H05B 6/6435 219/506 |
| 5,831,253 A | 11/1998 | Han et al. |
| 5,878,910 A | 3/1999 | Gibernau et al. |
| 5,919,389 A | 7/1999 | Uehashi et al. |
| 5,973,305 A | 10/1999 | Kim et al. |
| 5,981,929 A | 11/1999 | Maeda et al. |
| 6,018,158 A | 1/2000 | Kang |
| 6,054,696 A | 4/2000 | Lewis et al. |
| 6,057,535 A | 5/2000 | Derobert et al. |
| 6,097,019 A | 8/2000 | Lewis et al. |
| 6,268,593 B1 | 7/2001 | Sakai |
| 6,359,270 B1 | 3/2002 | Bridson |
| 6,429,370 B1 | 8/2002 | Norte et al. |
| 6,557,756 B1 | 5/2003 | Smith |
| 6,559,882 B1 | 5/2003 | Kerchner |
| 6,853,399 B1 | 2/2005 | Gilman et al. |
| 7,193,195 B2 | 3/2007 | Lundstrom et al. |
| 7,361,871 B2 | 4/2008 | Cho et al. |
| 7,476,828 B2 | 1/2009 | Genua |
| 7,482,562 B2 | 1/2009 | Song et al. |
| 7,926,313 B2 | 4/2011 | Schenkl et al. |
| 8,074,637 B2 | 12/2011 | Yamauchi |
| 8,389,916 B2 | 3/2013 | Ben-Shmuel et al. |
| 8,455,803 B2 | 6/2013 | Danzer et al. |
| 8,492,686 B2 | 7/2013 | Bilchinsky et al. |
| 8,530,807 B2 | 9/2013 | Niklasson et al. |
| 8,610,038 B2 | 12/2013 | Hyde et al. |
| 8,745,203 B2 | 6/2014 | McCoy |
| 8,803,051 B2 | 8/2014 | Lee et al. |
| 9,131,543 B2 | 9/2015 | Ben-Shmuel et al. |
| 9,132,408 B2 | 9/2015 | Einziger et al. |
| 9,179,506 B2 | 11/2015 | Sim et al. |
| 9,215,756 B2 | 12/2015 | Bilchinsky et al. |
| 9,374,852 B2 | 6/2016 | Bilchinsky et al. |
| 9,560,699 B2 | 1/2017 | Zhylkov et al. |
| 9,585,203 B2 | 2/2017 | Sadahira et al. |
| 2006/0289526 A1 | 12/2006 | Takizaki et al. |
| 2009/0134155 A1 | 5/2009 | Kim et al. |
| 2011/0031236 A1 | 2/2011 | Ben-Shmuel et al. |
| 2011/0168699 A1 | 7/2011 | Oomori et al. |
| 2011/0290790 A1 | 12/2011 | Sim et al. |
| 2012/0067872 A1 | 3/2012 | Libman et al. |
| 2012/0103972 A1 | 5/2012 | Okajima |
| 2012/0152939 A1 | 6/2012 | Nobue et al. |
| 2013/0048881 A1 | 2/2013 | Einziger et al. |
| 2013/0142923 A1 | 6/2013 | Torres et al. |
| 2013/0156906 A1 | 6/2013 | Raghavan et al. |
| 2013/0186887 A1 | 7/2013 | Hallgren et al. |
| 2013/0200066 A1 | 8/2013 | Gelbart et al. |
| 2013/0277353 A1 | 10/2013 | Joseph et al. |
| 2014/0277100 A1 | 9/2014 | Kang |
| 2015/0034632 A1 | 2/2015 | Brill et al. |
| 2015/0136758 A1 | 5/2015 | Yoshino et al. |
| 2015/0156827 A1 | 6/2015 | Ibragimov et al. |
| 2015/0173128 A1 | 6/2015 | Hosokawa et al. |
| 2015/0289324 A1 | 10/2015 | Rober et al. |
| 2015/0305095 A1 | 10/2015 | Huang et al. |
| 2015/0334788 A1 | 11/2015 | Hofmann et al. |
| 2015/0373789 A1 | 12/2015 | Meusburger et al. |
| 2016/0029442 A1 | 1/2016 | Houbloss et al. |
| 2016/0088690 A1 | 3/2016 | Kubo et al. |
| 2016/0119982 A1 | 4/2016 | Kang et al. |
| 2016/0219656 A1 | 7/2016 | Hunter, Jr. |
| 2016/0327281 A1 | 11/2016 | Bhogal et al. |
| 2016/0353528 A1 | 12/2016 | Bilchinsky et al. |
| 2016/0353529 A1 | 12/2016 | Omori et al. |
| 2017/0099988 A1 | 4/2017 | Matloubian et al. |
| 2017/0105572 A1 | 4/2017 | Matloubian et al. |

FOREIGN PATENT DOCUMENTS

| | | |
|---|---|---|
| CN | 201081287 Y | 7/2008 |
| CN | 102620324 A | 8/2012 |
| CN | 103156532 A | 6/2013 |
| CN | 203025135 | 6/2013 |
| CN | 203025135 U | 6/2013 |
| CN | 105042654 A | 11/2015 |
| CN | 204987134 U | 1/2016 |
| CN | 106103555 A | 11/2016 |
| EP | 0493623 A1 | 8/1992 |
| EP | 1193584 | 3/2002 |
| EP | 1424874 | 6/2004 |
| EP | 1424874 A2 | 6/2004 |
| EP | 1426692 A2 | 6/2004 |
| EP | 1795814 | 6/2007 |
| EP | 2031938 A1 | 3/2009 |
| EP | 2220913 B1 | 5/2011 |
| EP | 2405711 A2 | 11/2012 |
| EP | 2618634 A1 | 7/2013 |
| EP | 2775794 A1 | 9/2014 |
| FR | 2976651 A | 12/2012 |
| GB | 639470 A | 6/1950 |
| GB | 2367196 A | 3/2002 |
| JP | S55155120 | 12/1980 |
| JP | 57194296 U | 12/1982 |
| JP | 59226497 A | 12/1984 |
| JP | H0510527 A | 1/1993 |
| JP | H06147492 A | 5/1994 |
| JP | 2000304593 A | 11/2000 |
| JP | 2008108491 A | 5/2008 |
| JP | 2011146143 A | 7/2011 |
| JP | 2013073710 A | 4/2013 |
| KR | 2050002121 | 7/2005 |
| KR | 101359460 B1 | 2/2014 |
| KR | 20160093858 A | 8/2016 |
| RU | 2122338 C1 | 11/1998 |
| RU | 2215380 C2 | 10/2003 |
| RU | 2003111214 A | 11/2004 |
| RU | 2008115817 A | 10/2009 |
| RU | 2008137844 A | 3/2010 |
| WO | 03077601 A | 9/2003 |
| WO | 2008018466 A1 | 2/2008 |
| WO | 2008102360 A2 | 8/2008 |
| WO | 2009039521 A1 | 3/2009 |
| WO | 2011138680 A2 | 11/2011 |
| WO | 2012001523 A2 | 1/2012 |
| WO | 2012162072 | 11/2012 |
| WO | 2011039961 A1 | 2/2013 |
| WO | 2015024177 | 2/2015 |
| WO | 2015024177 A1 | 2/2015 |
| WO | 2016128088 A1 | 8/2016 |

\* cited by examiner

US 10,560,986 B2

METHOD FOR DETECTING THE STATUS OF POPCORN IN A MICROWAVE

FIELD OF THE INVENTION

This application is a National Stage Application of PCT/CN2013/081837, filed Aug. 20, 2013, entitled METHOD FOR DETECTING THE STATUS OF POPCORN IN A MICROWAVE, the contents of which are incorporated herein by reference, in their entireties.

BACKGROUND

The present invention generally relates to a method for popping popcorn in which end status indicators are used to determine when to end a popping cycle for the popcorn and a microwave which is operable to carry out the method.

SUMMARY

One embodiment of the present disclosure includes a method of popping popcorn in a microwave, where the microwave has a cooking chamber and an energy source which provides energy to the cooking chamber. A plurality of popcorn kernels are placed in the cooking chamber and the energy source is operated during a popcorn popping cycle. The popping sounds generated when the popcorn kernels are popped are detected. The energy source is directed to stop operating and end the popcorn popping cycle when the popping sounds satisfy one or more end status indicators. The end status indicators include: (a) reaching a predetermined number of popping sounds per a first time interval, (b) reaching a predetermined total number of popping sounds during the popping cycle, (c) reaching a predetermined change in the number of popping sounds per a second time interval, and (d) reaching a predetermined total popping cycle time. The microwave further includes a humidity sensor, and further including the step of: detecting the humidity level in the cooking chamber, wherein the end status indicators include (a) the humidity level falling to a predetermined percentage of a peak humidity level, (b) the number of popping sounds is reduced below a predetermined number of popping sounds per a first time interval, (c) reaching a predetermined change in the number of popping sounds per a second time interval, and (d) reaching a predetermined total popping cycle time.

Another embodiment of the present disclosure includes a method of popping popcorn in a microwave having a cooking chamber, an energy source which provides energy to the cooking chamber, a humidity sensor and a microphone sensor. The method includes the steps of placing a plurality of popcorn kernels in the cooking chamber and operating the energy source during a popcorn popping cycle. Popping sounds generated when the popcorn pops and the humidity level in the cooking chamber are detected. The energy source is directed to stop operating when the popping sound and the humidity level satisfy one or more end status indicators. The microwave further includes a humidity sensor, and further comprising the step of: detecting the humidity level in the cooking chamber, wherein the end status indicators include (a) the humidity level falling to a predetermined percentage of a peak humidity level, (b) the number of popping sounds is reduced below a predetermined number of popping sounds per a first time interval, (c) reaching a predetermined change in the number of popping sounds per a second time interval, and (d) reaching a predetermined total popping cycle time.

Yet another embodiment of the present disclosure includes a microwave having a cooking chamber and an energy source which is operable to provide energy to the cooking chamber. The microwave further includes a microphone sensor to detect popping sounds generated within the cooking chamber and a humidity sensor to detect a humidity level within the cooking chamber. An appliance control unit receives a first input based on the popping sounds detected by the microphone sensor and a second input based on the humidity detected by the humidity sensor, and uses the first input and the second input to direct the operation of the energy source.

These and other features, advantages, and objects of the present methods and devices will be further understood and appreciated by those skilled in the art upon studying the following specification, claims, and appended drawings.

DETAILED DESCRIPTION OF EMBODIMENTS

Figure 1:
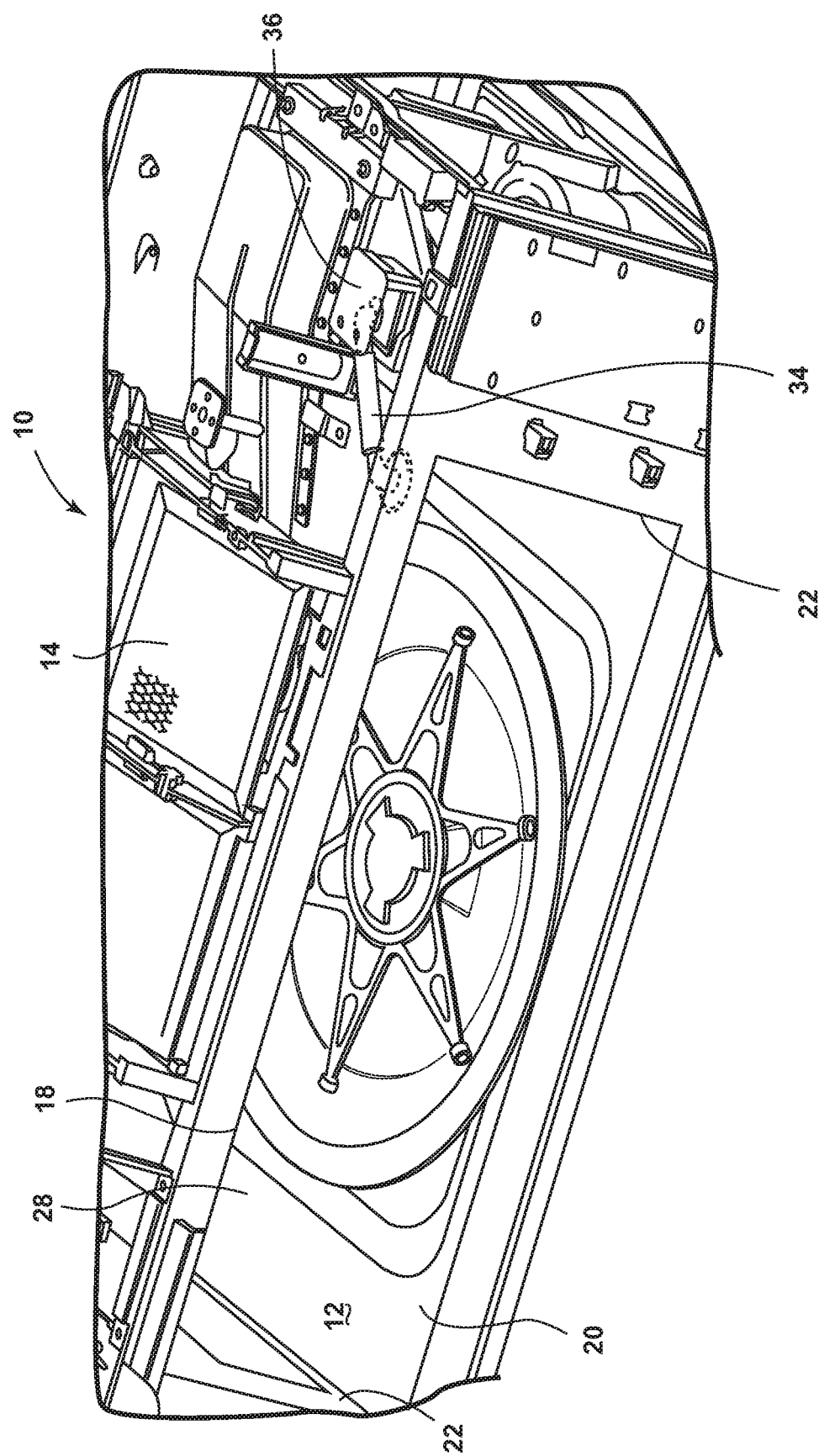
FIG. 1 is a top perspective view of a microwave according to one embodiment of the present invention.
Figure 6:
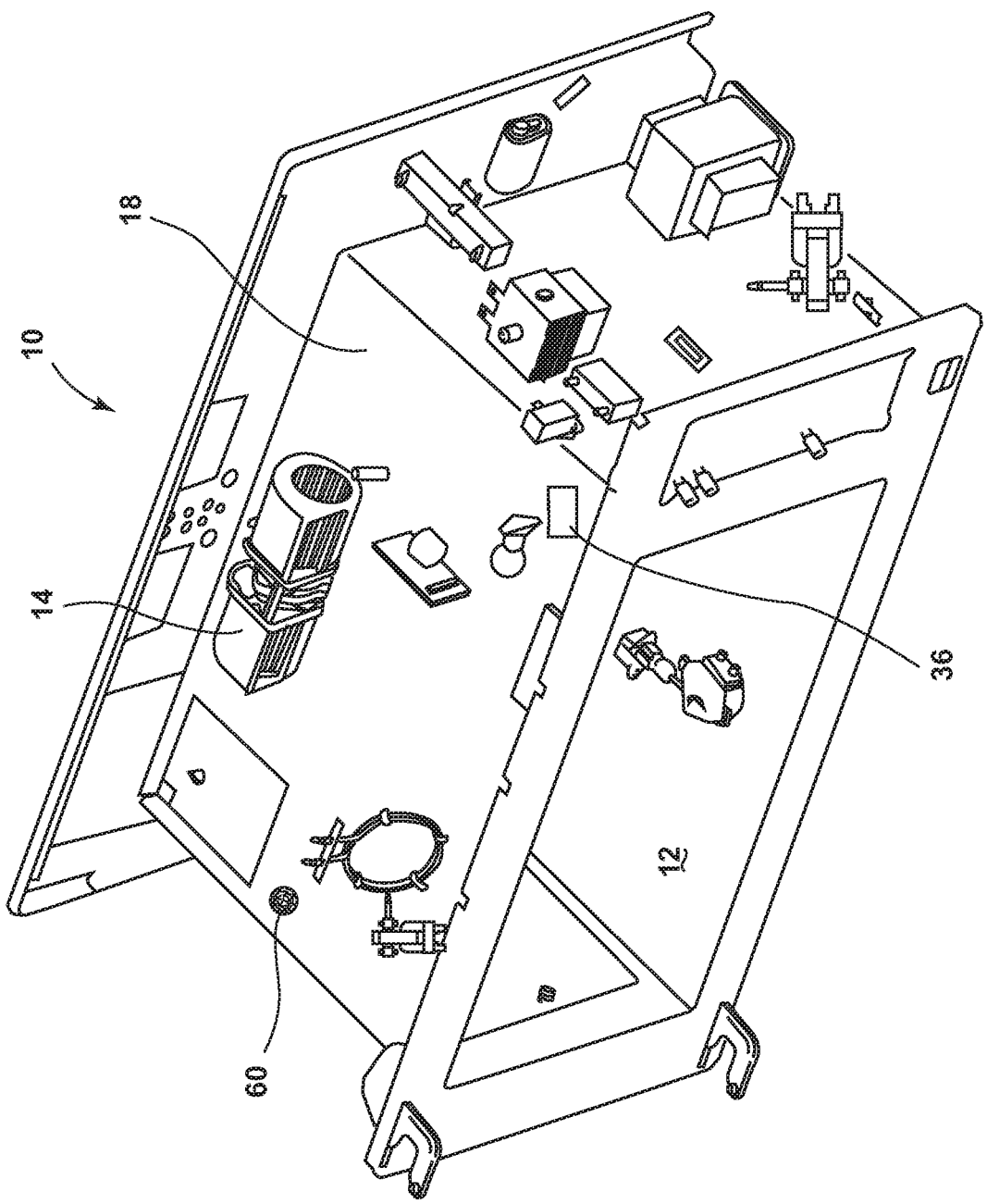
FIG. 6 is a partially exploded top perspective view of a microwave according to another embodiment of the present invention having a microphone sensor and a humidity sensor.

For purposes of description herein the terms "upper," "lower," "right," "left," "rear," "front," "vertical," "horizontal," and derivatives thereof shall relate to the device as oriented in FIGS. 1 and 6. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In one embodiment, as shown in FIG. 1, a microwave 10 includes a cooking chamber 12 and an energy source 14 (also called a magnetron herein) which provides microwave energy to the cooking chamber 12. The microwave 10 further includes a microphone sensor 16 (shown in FIG. 3) to detect popping sounds occurring within the cooking chamber 12. The popping sounds detected by the microphone sensor 16 are used by the microwave 10 to direct the operation of the magnetron 14. Though a magnetron is cited in some of the particular embodiments described herein, alternative energy sources 14 to provide energy to the cooking chamber 12 could also be used according to the present disclosure. Non-limiting examples of such alternative energy sources 14 include solid state oscillating circuit energy sources or other known or later developed energy sources 14 whose operation can be directed by the microwave 10.

Figure 2:
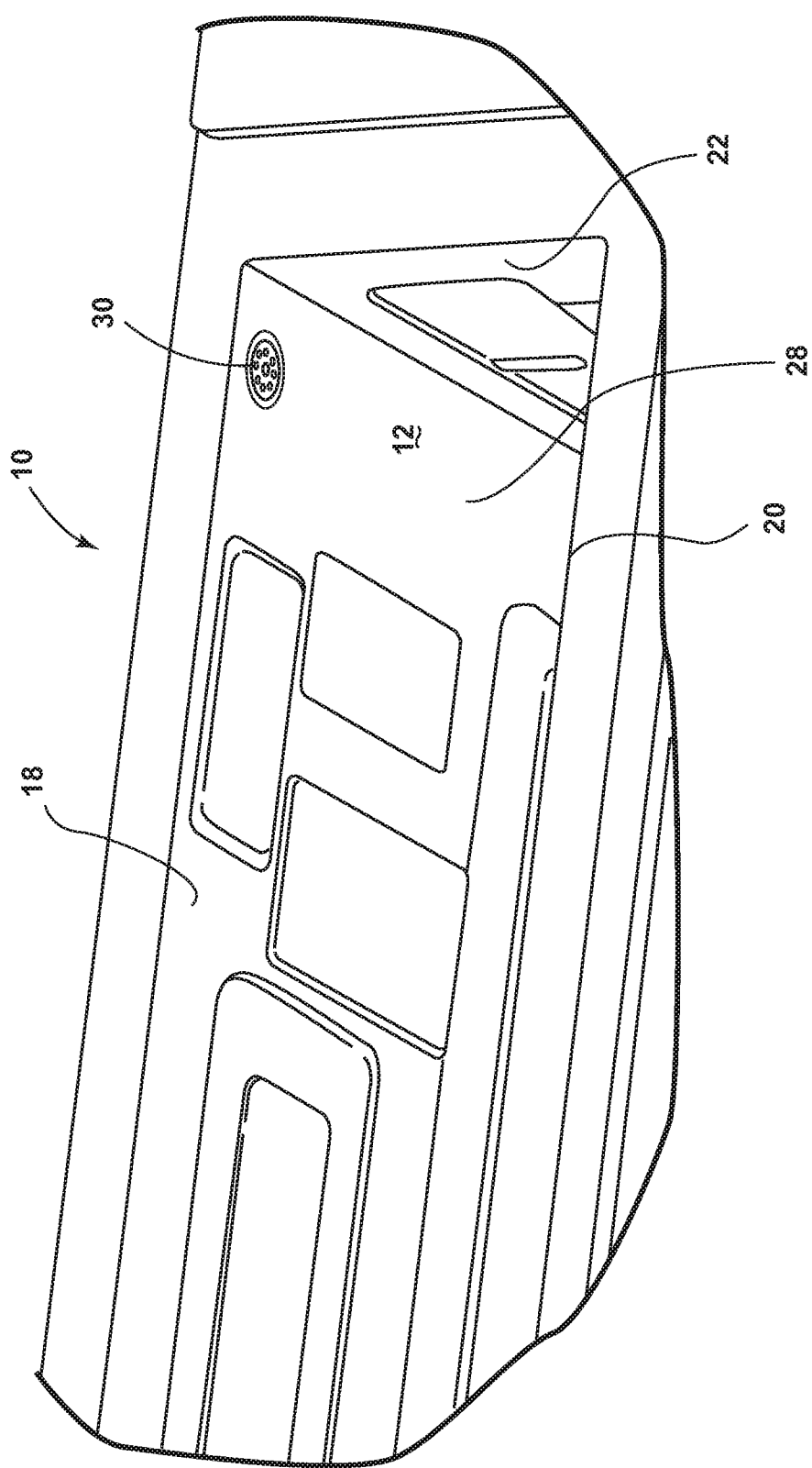
FIG. 2 is a bottom perspective view of a cooking chamber of the microwave shown in FIG. 1.

In particular, in the embodiment shown in FIGS. 1-2, the cooking chamber 12 is defined by a top wall 18, a bottom wall 20, opposing side walls 22, a back wall (not shown) and a door (not shown) that encloses the front of the cooking chamber 12. A liner 28 encloses the top wall 18, bottom wall 20, side walls 22 and back wall 24 of the microwave 10. The liner 28 has a plurality of holes 30 therethrough which permit the passage of sound waves 32 (shown in FIG. 3). A sound guide tube 34 communicates with the holes 30 to direct sound waves 32 from the cooking chamber 12 to the microphone sensor 16 which is mounted on a printed circuit board 36 and located above a top wall 18 of the cooking chamber 12.

Figure 3:
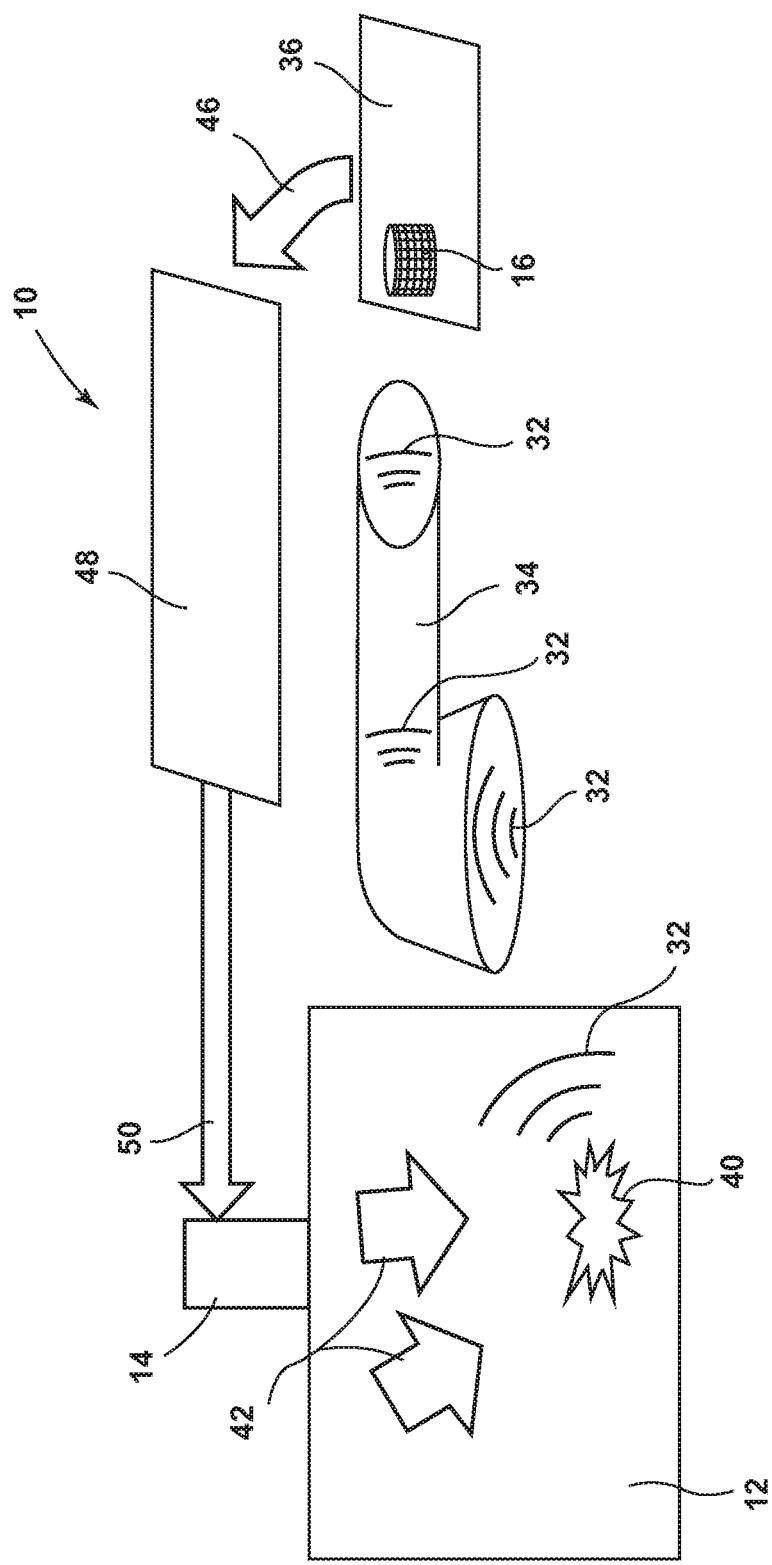
FIG. 3 is a schematic of a microphone sensor for use in the microwave shown in FIG. 1.

In use, as shown in the embodiment schematically represented in FIG. 3, popcorn kernels 40 are placed within the cooking cavity 12 of the microwave 10. The magnetron 14 is activated to provide microwave energy 42 to the cooking chamber 12. As the popcorn kernels 40 are heated by the microwave energy 42, they begin to "pop," rapidly expanding and bursting to form fluffy popcorn. The rapid expansion also causes an audible "pop," with sound waves 32 which are detected by the microphone sensor 16 after passage of the sound waves 32 through the sound guide tube 34. The microphone sensor 16 transmits a first output signal 46 regarding the popping sound waves 32 to an appliance control unit 48, which uses a control signal 50 to control the magnetron 14 based on the detection of sound waves 32 generated by the popping of the popcorn kernels 40.

Figure 4:
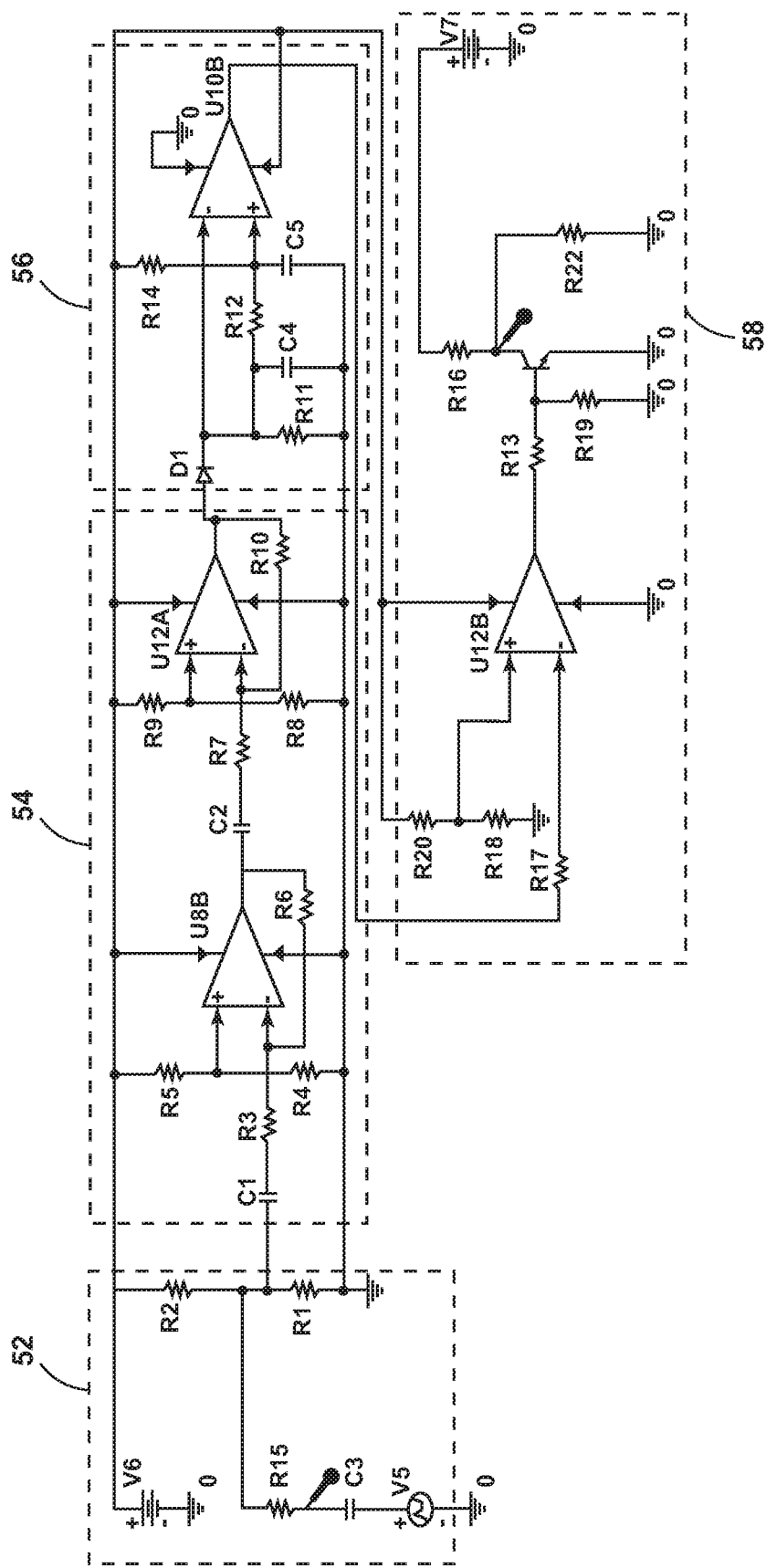
FIG. 4 is an electrical diagram of the microphone sensor for use in the microwave shown in FIG. 1.

In one embodiment, as shown in the electrical schematic of FIG. 4, the microphone sensor 16 includes a microphone detect module 52 and detects the sound wave 32 and converts the sound wave 32 to an electronic signal. One non-limiting example of a microphone sensor that is suitable for use in detecting the popping sound is sold by Bestar, under part number BCM6027OPF-42-P2.8.LF. An amplifier 54 amplifies the electronic signal by 100 times, and converts it from an analog electronic signal to a digital signal by a pop detector 56. The digital signal is transferred to a digital signal processor 58, which analyzes the digital signal over time and includes the functionality of the appliance control unit 48 (as shown in FIG. 3). The control signal output 50 of the appliance control unit 48 controls the operation of the magnetron 14.

Figure 5:
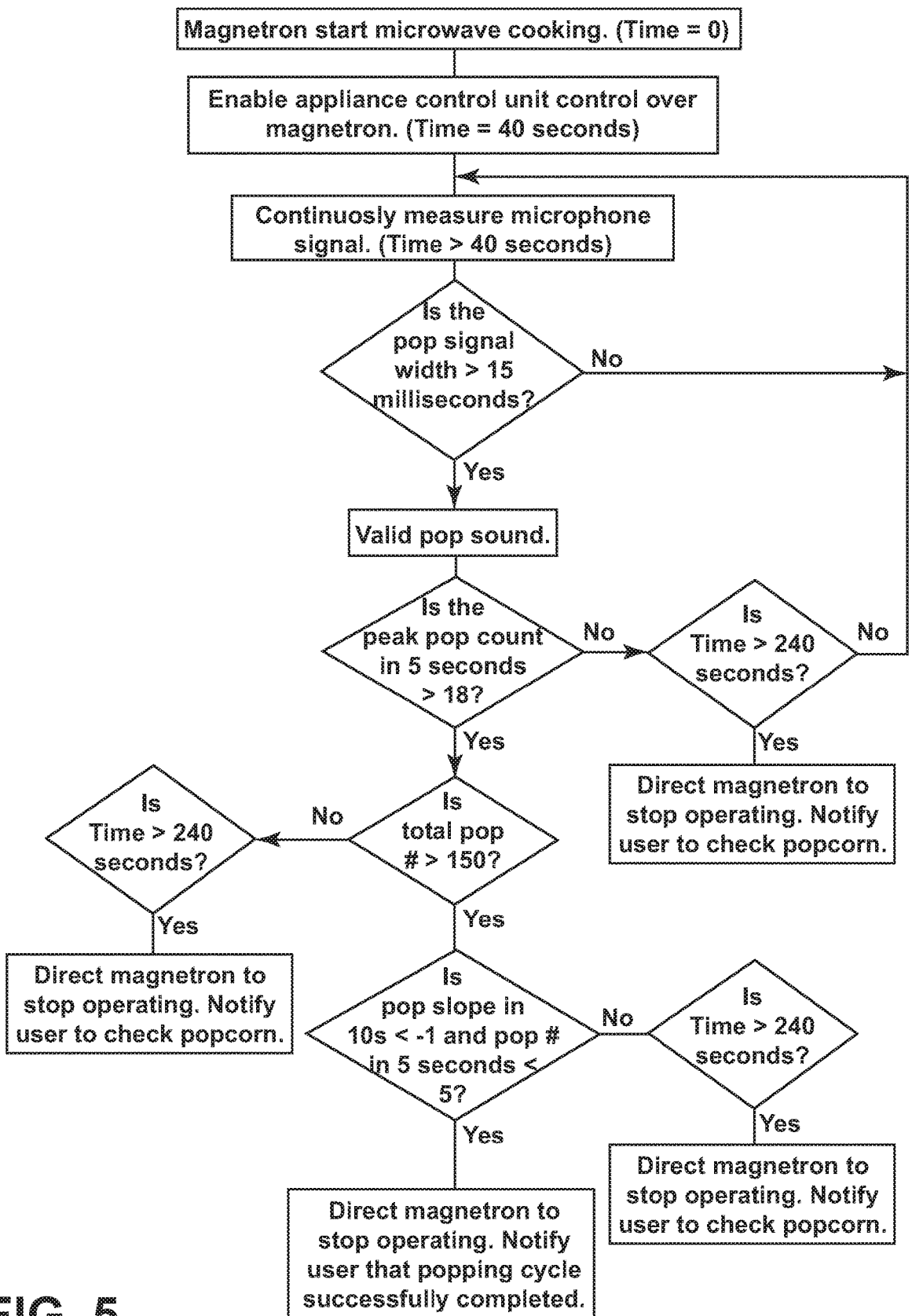
FIG. 5 is a flow chart illustrating a method of popping popcorn using the microwave shown in FIG. 1.

FIG. 5 includes a flow chart of one embodiment of digital signal processing carried out by the appliance control unit 48. In the method shown in FIG. 5, the magnetron 14 is activated to begin supplying microwave energy 42 to the cooking chamber 12 of the microwave 10 at an initial time (T=0). The magnetron 14 is permitted to operate for 40 seconds prior to activating the appliance control unit 48. After the initial 40 seconds has passed, the microphone sensor 16 continuously monitors sound waves 44 originating in the cooking chamber 12, and provides an output signal 46 regarding the same to the appliance control unit 48. The appliance control unit 48 evaluates and analyzes the output signal 46 of the microphone sensor 16, and directs operation of the magnetron 14. The time delay prior to activation of the appliance control unit 48 could be set to any time period which is expected to be less than the total required popping cycle time. The delay preferably lasts until the popcorn kernels 40 are expected to reach a consistent frequency of popping.

The appliance control unit 48 filters the output signal 46 from the microphone sensor by evaluating the signal 46 to determine whether it represents a popping sound. If the signal width is greater than 15 milliseconds, it is considered a popping sound. The appliance control unit 48 continuously tracks a peak pop count, a total pop number, a pop slope, and the elapsed time. The "peak pop count" is the maximum number of popping sounds detected in a first time interval. The "total pop number" is the number of popping sounds detected during a given popcorn popping cycle. The "pop slope" is a change in the number of popping sounds per a second time interval, i.e., the number of popping sounds in a second time interval subtracted from the number of popping sounds in a time interval of the same length immediately preceding the second time interval. The appliance control unit 48 also tracks the elapsed time of the magnetron 14 operating, i.e., the popping cycle.

The appliance control unit 48 uses the measurements of peak pop count, total pop number and pop slope as end status indicators to determine when the popcorn popping cycle should be terminated to avoid burning or overheating the popcorn kernels 40. End status indicators include (a) reaching a predetermined number of popping sounds per a first time interval, (b) reaching a predetermined total number of popping sounds during the popcorn popping cycle, and (c) reaching a predetermined change in the number of popping sounds per a second time interval. In certain embodiments, such as that shown in FIG. 5, these end status indicators are found in order, for example, the peak pop count must exceed a threshold number of popping sounds in the first time interval before the appliance control unit analyzes whether the total pop count has been met, and the total pop count must be met before the appliance control unit analyzes whether the pop slope is decreasing from its peak value.

In the embodiment shown in FIG. 5, the appliance control unit monitors for the following end status indicators: (a) greater than 18 popping sounds in a 5 second interval, (b) greater than 150 total popping sounds during the popping cycle, and (c) the number of popping sounds in one 10 second interval being at least 1 popping sound less than the number of popping sounds in the 10 second interval immediately preceding the 10 second interval. Particularly, as shown in the embodiment depicted in FIG. 5, the appliance control unit monitors first for reaching greater than 18 popping sounds in a 5 second interval. Once this end status indicator is reached, the appliance control unit evaluates whether 150 total pops have occurred during the popping cycle. Once the total pop count is reached, the appliance control unit monitors for decreasing pop frequency, where the decrease in frequency reaches 1 less pop per 10 second interval (than the previous 10 second interval).

Alternative threshold values for the predetermined number of popping sounds per a first time interval, the predetermined total number of popping sounds during the popcorn popping cycle, and the predetermined change in the number of popping sounds per a second time interval can be determined through experimentation, and may be based on a particular microwave or cooking apparatus model. For example, the threshold for a predetermined number of popping sounds per a first time interval could be set at a value chosen from about 8 to about 15 popping sounds per 5 seconds, more preferably at a value chosen from about 8 to about 12 popping sounds per 5 seconds. Additionally, the threshold for the total number of popping sounds during the popcorn popping cycle could be set at a value between about 80 and about 150, or more preferably at a value chosen from about 80 to about 100.

If all of the end status indicators are detected, a user of the microwave is notified that the popping cycle has successfully ended. If any of the end status indicators listed above have not been reached within a predetermined time period, the user is notified to check the popcorn to determine whether popping has finished. Therefore, the total predetermined time period of the popping cycle also functions as an end status indicator, and reaching the total predetermined time period on its own is sufficient for the appliance control unit 48 to stop the magnetron 14. As shown in the embodiment depicted in FIG. 5, the predetermined time period in that embodiment is 240 seconds. Having a mechanism to stop the operation of the magnetron 14 prevents burning or other overcooking of the popcorn kernels 40 being popped in the microwave 10.

In another embodiment, as shown in FIG. 6, in which like parts are given the same numbers as shown in FIGS. 1-5, the microwave 10 includes the cooking chamber 12 and a magnetron 14 to provide microwave energy to the cooking chamber 12. The microwave 10 further includes the microphone sensor 16 (not shown in FIG. 6) mounted on a printed circuit board 36 to detect popping sounds occurring within the cooking chamber 12, and also includes a humidity sensor 60 to measure the humidity within the cooking chamber 12. One example of a suitable humidity sensor 60 is a humidity sensor sold by Shibaura, under the part number HS-13-W5D-1. Data collected by the microphone sensor 16 and the humidity sensor 60 is used by the appliance control unit 48 to direct the operation of the magnetron 14. Similarly to the description above, the microphone sensor 16 and humidity sensor 60 each have an electronic signal output, and the signal output is analyzed by the appliance control unit 48. The appliance control unit 48 emits a control signal which controls the operation of the magnetron 14 based on the readings of the microphone sensor 16 and humidity sensor 60.

In particular, in the embodiment shown in FIG. 6, the microphone sensor 16 and humidity sensor 60 are placed above the top wall 18 of the microwave 10, but communicate with the cooking chamber 12 to measure the conditions in the cooking chamber 12.

Figure 7:
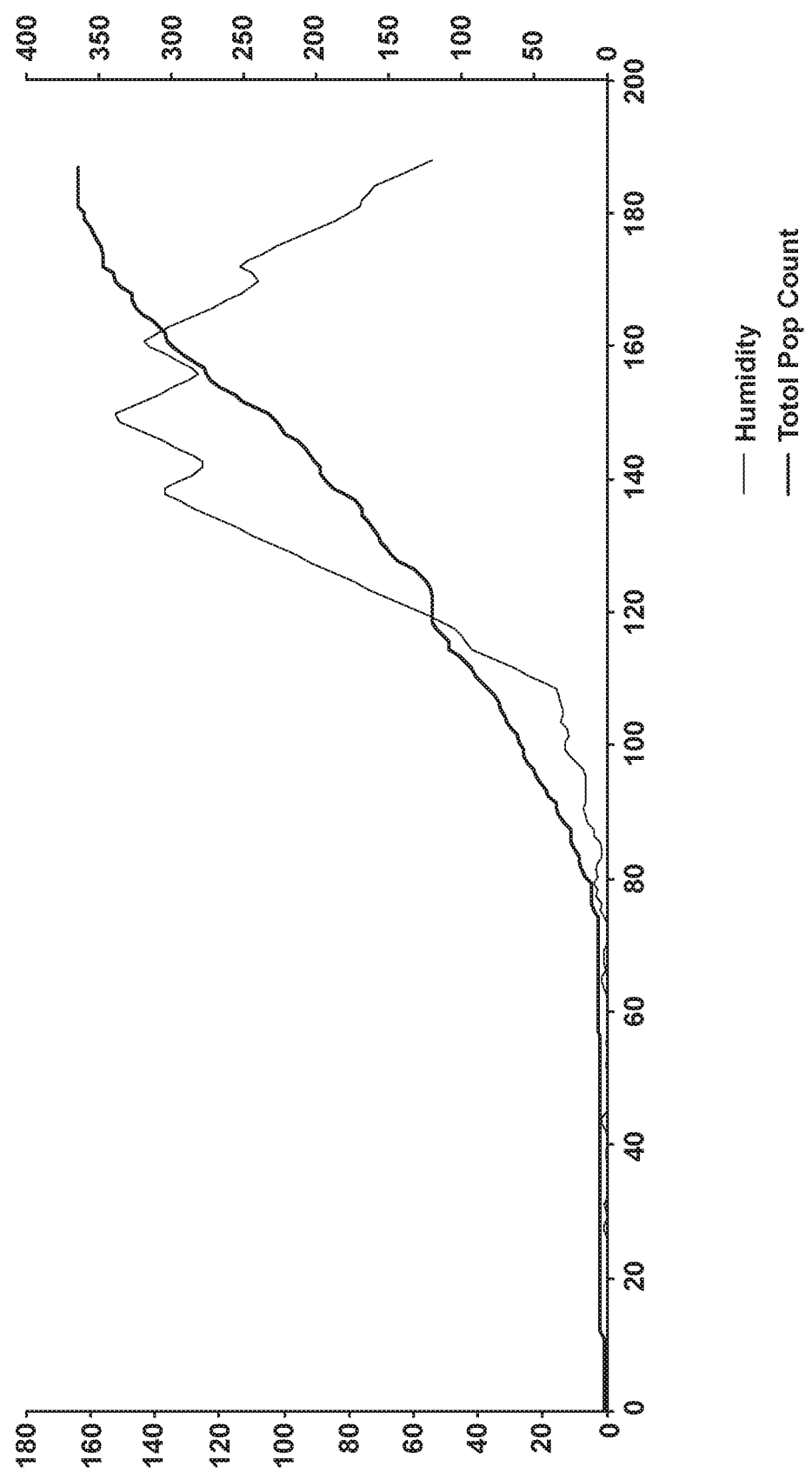
FIG. 7 is a graph showing measurements from the microphone sensor and the humidity sensor during popcorn popping.
Figure 8:
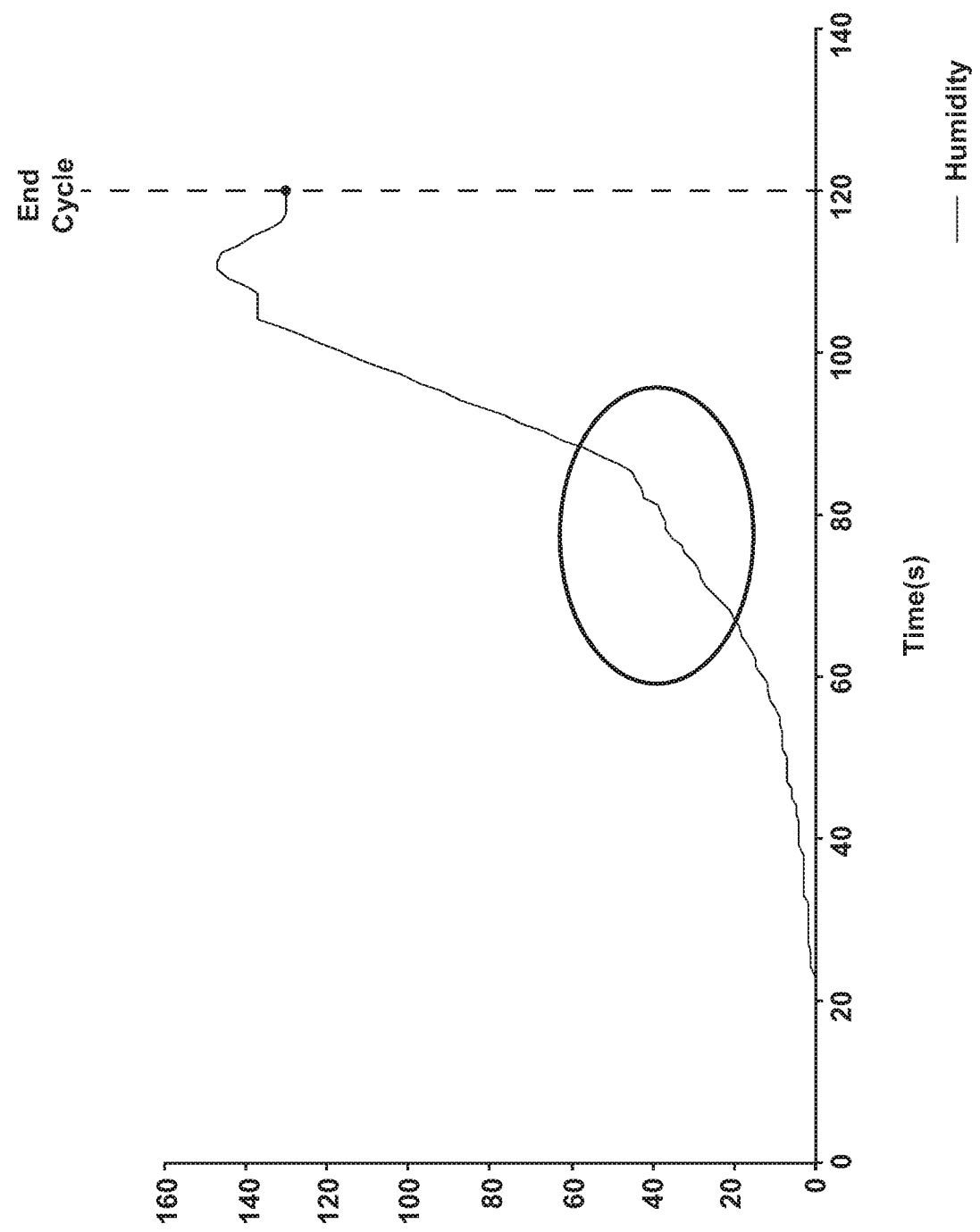
FIG. 8 is a graph showing the humidity measurement during popcorn popping.
Figure 9:
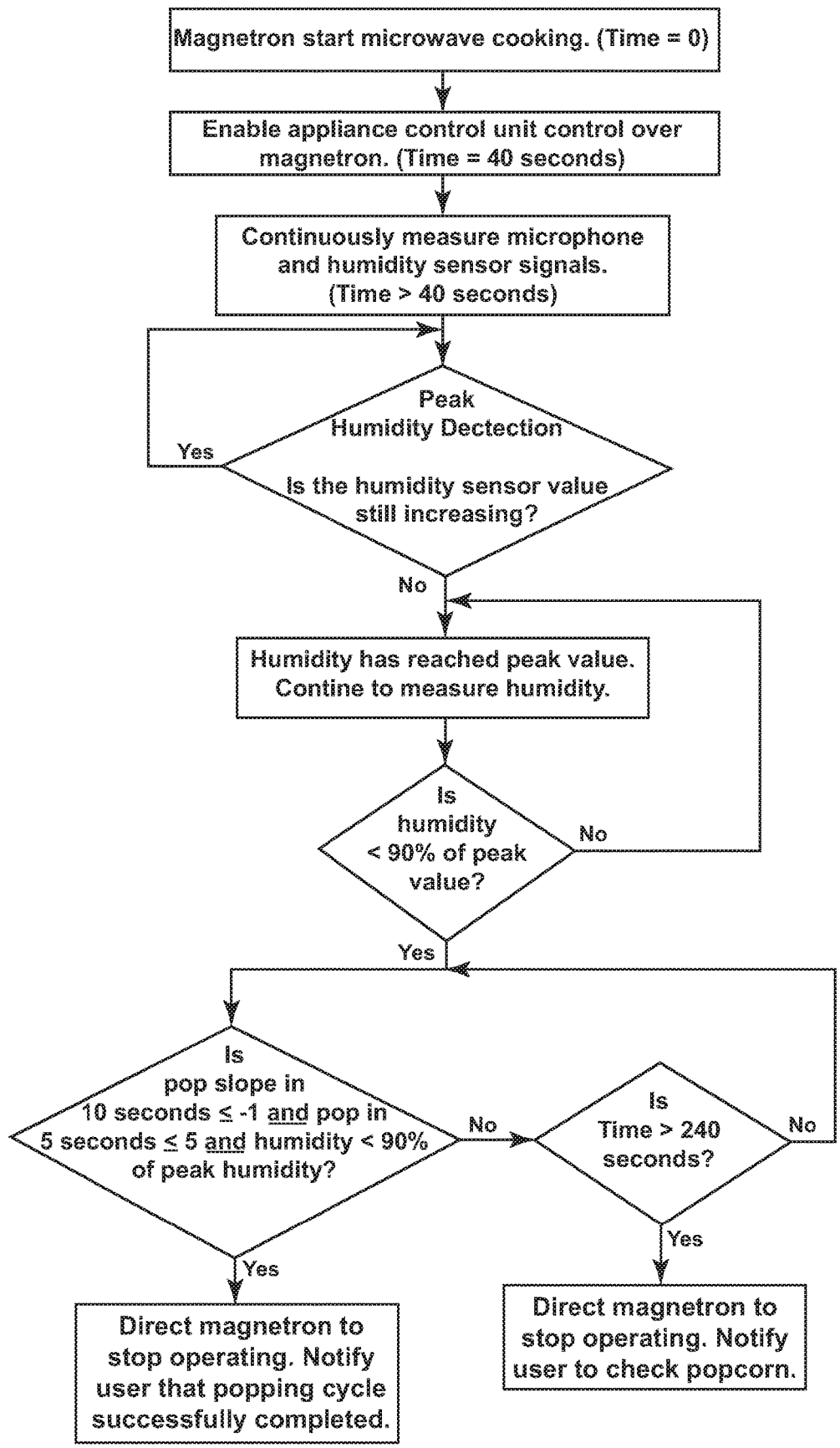
FIG. 9 is a flow chart illustrating a method of popping popcorn using the microwave shown in FIG. 5.

As depicted in the graphs of FIGS. 7-8, during heating of popcorn kernels 40 in a bag (not shown) in the cooking chamber 12, the humidity in the cooking chamber 12 remains relatively constant for a time, and then increases rapidly toward a peak after the popcorn kernels 40 begin to pop and expand to open the bag. The humidity level rises to a peak, levels off, and then begins to decrease. As the humidity levels off and begins to decrease, the rate of popping of the popcorn kernels 40 begins to slow. At this point, when the humidity level begins to decrease and the rate of popping of popcorn kernels 40 begins to slow, the popcorn popping cycle is generally complete and continued heating using the magnetron 14 may cause the popcorn kernels 40 to burn. Therefore, as shown in the embodiment depicted in FIG. 8, the popping cycle is ended when the humidity level has decreased to 90% of its peak FIG. 9 depicts a flow chart of one embodiment of digital signal processing carried out by the appliance control unit 48 when receiving information from a humidity sensor 60 and from a microphone sensor 16. In the method shown in FIG. 9, the magnetron 14 is activated to begin supplying microwave energy 42 to the cooking chamber 12 of the microwave 10. The magnetron 14 is permitted to operate for 40 seconds prior to activating the appliance control unit 48, or prior to the appliance control unit 48 tracking the data for purposes of controlling the magnetron 14. After the initial 40 seconds has passed, the microphone sensor 16 continuously monitors sounds originating in the cooking chamber 12, and provides a first output signal regarding the popping sounds to the appliance control unit 48. Additionally, after the initial 40 seconds has passed, the humidity sensor 60 continuously monitors the humidity level in the cooking chamber 12, and provides a second output signal regarding the humidity level 60 to the appliance control unit 48. The appliance control unit 48 evaluates and analyzes the first output signal and the second output signal, and directs operation of the magnetron 14. The time delay prior to activation of the appliance control unit 48 could be set to any time period which is expected to be less than the total required popping cycle time, though the delay preferably lasts for less time than it takes for the humidity level in the cooking chamber 12 to reach its peak value.

The appliance control unit 48 continuously tracks the humidity level in the cooking chamber 12, and detects a peak in the humidity level by determining when the humidity level is no longer increasing. When the humidity level is no longer increasing, the appliance control unit 48 evaluates whether the humidity level has fallen to below a predetermined percentage of the peak humidity level. After the humidity level has reached the predetermined percentage, the appliance control unit 48 continuously tracks the number of popping sounds in a first time interval, and the pop slope, i.e., the number of popping sounds in a second time interval subtracted from the number of popping sounds in a time interval of the same length immediately preceding the second time interval. The appliance control unit 48 also tracks the elapsed time of the magnetron 14 operating, i.e., the popping cycle.

The appliance control unit 48 uses the measurements of the humidity level and popcorn popping sounds as end status indicators to determine when the popcorn popping cycle should be terminated to avoid burning or overheating the popcorn kernels 40. As shown in the embodiment depicted in FIG. 9, the end status indicators include (a) falling below a predetermined percentage of the peak humidity level, (b) falling below a predetermined number of popping sounds per a first time interval, (c) reaching a predetermined change in the number of popping sounds per a second time interval, and (d) reaching a predetermined total popping cycle time. As shown in FIG. 9, the humidity-related end-status indicator is evaluated first, and then when that end status indicator is met, the popping noise-related end status indicators are evaluated.

In the embodiment shown in FIG. 9, the appliance control unit monitors for the following end status indicators (a) less than 90% of the peak humidity level, (b) less than 5 popping sounds per a 5 second interval, and (c) the number of popping sounds in one 10 second interval being at least 1 popping sound less than the number of popping sounds in the 10 second interval immediately preceding the 10 second interval. If all of the end status indicators are detected, the user is notified that the popping cycle has successfully ended. If any of the end status indicators listed above have not been reached within a predetermined time period, the user is notified to check the popcorn to determine whether popping has finished. Therefore, the total predetermined time period of the popping cycle also functions as an end status indicator, and reaching the total predetermined time period on its own is sufficient for the appliance control unit 48 to stop the magnetron 14. As shown in the embodiment depicted in FIG. 9, the predetermined time period in that embodiment is 240 seconds.

The microwave 10 and method for its use described herein permit the cooking of popcorn kernels 40 to their desired state, with the end status indicators helping the appliance control unit 48 to determine when the popping is complete, so that the popcorn popping cycle is not terminated too early (leaving a larger number of unpopped kernels 40) or extended too long (overcooking or burning the popcorn kernels 40). In one embodiment of a microwave 10 according to the present disclosure, the microwave 10 includes the cooking chamber 12 and magnetron 14 which is operable to provide microwave energy 42 to the cooking chamber 12. The microwave 10 also incorporates the microphone sensor 16 to detect popping sounds generated within the cooking chamber 12 and the humidity sensor 60 to detect a humidity level within the cooking chamber 12. The appliance control unit 48 is also provided, and the appliance control unit 48 receives the first input based on the sound waves 32 detected by the microphone sensor 16 and the second input based on the humidity detected by the humidity sensor 60, and uses the first input and the second input to direct the operation of the magnetron 14.

One method of using the microwave 10 described herein includes placing a plurality of popcorn kernels 40 in the cooking chamber 12 of the microwave 10, operating the energy source 14 during a popcorn popping cycle, and detecting popping sounds generated when the popcorn kernels 40 are popped. The method further includes the step of directing the energy source 14 to stop operating and end the popcorn popping cycle when the popping sounds satisfy one or more end status indicators. The end status indicators include (a) reaching a predetermined number of popping sounds per a first time interval, (b) reaching a predetermined total number of popping sounds during the popcorn popping cycle, (c) reaching a predetermined change in the number of popping sounds per a second time interval, and (d) reaching a predetermined total popping cycle time.

Another method of using the microwave described herein includes placing a plurality of popcorn kernels 40 in the cooking chamber 12 of the microwave 10 and operating the energy source 14 during a popcorn popping cycle. The humidity level in the cooking chamber 12 and popping sounds generated when the popcorn kernels 40 are popped are detected, and the energy source 14 is directed to stop operating when the popping sound and the humidity level satisfy one or more of the end status indicators. Potential end status indicators include (a) the humidity level falling to a predetermined percentage of a peak humidity level, (b) the number of popping sounds is reduced below a predetermined number of popping sounds per a first time interval, (c) reaching a predetermined change in the number of popping sounds per a second time interval, and (d) reaching a predetermined total popping cycle time.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A method of popping popcorn in a microwave having a cooking chamber and an energy source which provides energy to the cooking chamber, comprising the steps of:
    operating the energy source during a popcorn popping cycle;
    detecting, by a microphone sensor, popping sounds generated when the popcorn kernels are popped, wherein the microphone sensor is configured to provide the detected popping sounds as a first input to a control unit;
    detecting, by a humidity sensor, a humidity level in the cooking chamber, wherein the humidity sensor is configured to provide the detected humidity level to the control unit as a second input;
    determining, by the control unit, when a humidity level in the cooking chamber is at a peak humidity level based on the second input provided by the humidity sensor;
    determining, by the control unit, when the humidity level has fallen below a predetermined percentage of the peak humidity level based on the second input provided by the humidity sensor; and
    ending the popcorn popping cycle when the humidity level detected by the humidity sensor remains below a predetermined percentage of the peak humidity level and at least one of the following end status indicators is met: (a) a number of popping sounds detected by the microphone sensor is below a predetermined number of popping sounds per a first time interval and (b) a predetermined change in the number of popping sounds detected by the microphone sensor per a second time interval is below a predetermined number.

2. The method of claim 1, wherein the predetermined number of popping sounds per a first interval is chosen to be between about 8 and about 12 popping sounds per a 5-second interval.

3. The method of claim 1, further comprising the step of:
notifying a user that the popcorn popping cycle has ended when a predetermined total popping cycle time has elapsed.

4. The method of claim 3, wherein the predetermined total popping cycle time is 240 seconds.

5. The method of claim 1, further comprising the steps of:
waiting a predetermined amount of time to begin detecting the popping sound; and
evaluating whether a sound detected after the predetermined amount of time is the popping sound.

6. The method of claim 5, wherein the predetermined amount of time to begin detecting the popping sound is 40 seconds.

7. The method of claim 1, wherein the predetermined percentage of the peak humidity level is 90%.

8. The method of claim 1, wherein the predetermined number of popping sounds per a first interval is five popping sounds per a 5-second interval.

9. The method of claim 1, wherein the predetermined change in the number of popping sounds per a second interval is a decrease of one popping sound per a 10-second time interval, as compared to a previous 10-second time interval.

10. The method of claim 1, wherein the ending the popcorn popping cycle when the humidity level detected by the humidity sensor remains below a predetermined percentage of the peak humidity level comprises:
ending the popcorn popping cycle when the humidity level detected by the humidity sensor remains below a predetermined percentage of the peak humidity level and both of the following end status indicators are satisfied: (a) a number of popping sounds detected by the microphone sensor is below a predetermined number of popping sounds per a first time interval and (b) a predetermined change in the number of popping sounds detected by the microphone sensor per a second time interval is below a predetermined number.

11. A microwave, comprising:
a cooking chamber;
an energy source which is operable to provide energy to the cooking chamber during a popcorn popping cycle;
a microphone sensor configured to detect popping sounds generated when popcorn kernels are popped;
a humidity sensor configured to detect a humidity level within the cooking chamber; and
an appliance control unit configured to receive a first input based on the popping sounds detected by the microphone sensor and a second input based on the humidity detected by the humidity sensor, and
wherein the control unit is configured to end the popcorn popping cycle when the following combination of end status indicators are satisfied:
(a) the humidity level detected by the humidity sensor remains below a predetermined percentage of a peak humidity level detected by the humidity sensor during the popcorn popping cycle and at least one of (b) a number of popping sounds detected by the microphone sensor is below a predetermined number of popping sounds per a first time interval and (c) a predetermined change in the number of popping sounds detected by the microphone sensor per a second time interval is below a predetermined number.

12. The microwave of claim 11, wherein the predetermined number of popping sounds per a first interval is chosen to be between about 8 and about 12 popping sounds per a 5-second interval.

13. The microwave of claim 11, wherein the control unit is further configured to:
notify a user that the popcorn popping cycle has ended when a predetermined total popping cycle time has elapsed.

14. The microwave of claim 13, wherein the predetermined total popping cycle time is 240 seconds.

15. The microwave of claim 11, wherein the control unit is further configured to:
wait a predetermined amount of time to begin detecting the popping sound; and
evaluate whether a sound detected after the predetermined amount of time is the popping sound.

16. The microwave of claim 15, wherein the predetermined amount of time to begin detecting the popping sound is 40 seconds.

17. The microwave of claim 11, wherein the predetermined percentage of the peak humidity level is 90%.

18. The microwave of claim 11, wherein the predetermined number of popping sounds per a first interval is five popping sounds per a 5-second interval.

19. The microwave of claim 11, wherein the predetermined change in the number of popping sounds per a second interval is a decrease of one popping sound per a 10-second time interval, as compared to a previous 10-second time interval.

20. The microwave of claim 11, wherein the control unit is configured to end the popcorn popping cycle when the end status indicators (a), (b), and (c) are all satisfied.

* * * * *